(12) United States Patent
Fisch

(10) Patent No.: US 10,710,782 B2
(45) Date of Patent: Jul. 14, 2020

(54) FILTER CAP ASSEMBLY INCLUDING PROTECTIVE BAFFLE AND METHOD OF USE

(71) Applicant: Performance Systematix, Inc., Grand Rapids, MI (US)

(72) Inventor: Adam Jeffery Fisch, Dorr, MI (US)

(73) Assignee: Performance Systematix, Inc., Grand Rapids, MI (US)

( * ) Notice: Subject to any disclaimer, the term of this patent is extended or adjusted under 35 U.S.C. 154(b) by 136 days.

(21) Appl. No.: 15/942,801

(22) Filed: Apr. 2, 2018

(65) Prior Publication Data

US 2018/0222644 A1 Aug. 9, 2018

Related U.S. Application Data

(63) Continuation-in-part of application No. 14/857,090, filed on Sep. 17, 2015, now Pat. No. 10,351,320.

(51) Int. Cl.
| | |
|---|---|
| *B65D 51/16* | (2006.01) |
| *B01D 46/00* | (2006.01) |
| *B01D 46/54* | (2006.01) |
| B65D 41/16 | (2006.01) |
| B65D 41/04 | (2006.01) |

(52) U.S. Cl.
CPC ..... *B65D 51/1616* (2013.01); *B01D 46/0098* (2013.01); *B01D 46/543* (2013.01); *B01D 2279/35* (2013.01); *B65D 41/04* (2013.01); *B65D 41/16* (2013.01)

(58) Field of Classification Search
CPC .... B65D 41/04; B65D 41/16; B01D 46/0098; B01D 46/543

USPC .......................................................... 215/308
See application file for complete search history.

(56) References Cited

U.S. PATENT DOCUMENTS

| | | | |
|---|---|---|---|
| 5,513,781 A | 5/1996 | Ullrich | |
| 6,196,409 B1 | 3/2001 | Lake | |
| 2009/0200308 A1* | 8/2009 | Walsh | B65D 51/1616 220/367.1 |

FOREIGN PATENT DOCUMENTS

WO 97/02994 1/1997

\* cited by examiner

*Primary Examiner* — James N Smalley
*Assistant Examiner* — Madison L Poos
(74) *Attorney, Agent, or Firm* — Kohn & Associates, PLLC

(57) ABSTRACT

A filter baffle assembly including a filter cap engageable to a mouth of a container, the filter cap including a filter vent operatively attached to a liner situated within an inner space of the filter cap, and a gas permeable point baffle welded to the liner and covering the filter vent, the point baffle including at least one perforation to permit gas exchange between the container interior and the filter vent, and to protect the filter vent from contact with contents in the container. A gas permeable point baffle for protecting a filter vent from contact with the contents of a container, including at least one perforation, the point baffle being welded to a liner and covering a filter vent operatively attached to the liner, housed within a cap engageable to the mouth of the container. A method for protecting a filter vent from the contents of a container.

5 Claims, 5 Drawing Sheets

FILTER CAP ASSEMBLY INCLUDING PROTECTIVE BAFFLE AND METHOD OF USE

TECHNICAL FIELD

The invention relates to relates to venting devices for equalizing gas pressure between the interior and exterior of a container, and more specifically to devices wherein a gas-permeable filter vent is protected from contact with container contents by a baffle, and to methods for protecting a filter vent with a baffle.

BACKGROUND OF THE INVENTION

Sealed gas-tight containers require venting when gas pressure must be equalized between the interior and exterior of the container. Without venting, a flexible gas-tight container will bloat, leak, and possibly burst when the interior pressure exceeds the exterior pressure. Bloating can occur when the contents of the container generates gasses or heat by chemical reaction, for example when the contents include a peroxide-based toothpaste. Bloating can also occur when the container is stored in a heated environment. An unvented flexible gas-tight container will collapse when the internal pressure is reduced, for example when atmospheric oxygen is scavenged by one of the ingredients housed in the container. Some modes of transportation put a container at risk of both bursting and collapse. During vehicular transport through mountains and valleys, for example, a container is subjected to pressures that can rise above and drop below sea level pressure. Rigid gas-tight containers, such as glass containers, are susceptible to bursting or imploding if the internal and external pressures become sufficiently discrepant.

One way to equalize pressure is to provide a filter vent in the cap, lid, or other closure of a container. Filter vents generally include a gas-permeable filter, or other gas permeable microporous medium, which is interposed between the interior of the container and a vent aperture. The filter vent permits gases to diffuse in and out of the interior of the container, via the vent aperture, while excluding particulates larger than a threshold size, as well as liquids of a particular range of hydrophobicity. The term "filter cap" will be used as a generic term for all container closures fitted with a filter vent.

Filter caps such have a serious drawback. The pores of the filter are susceptible to being filled and clogged by the contents of the container. Existing solutions to this problem are not satisfactory. PCT Application No. WO 97/02994 to Vakharia ("Vakharia") discloses a gas permeable membrane mounted at an angle to the inner upper surface of a bottle cap. Angling of the membrane is intended to cause liquid to roll off the membrane surface instead of remaining fixed to the membrane surface. U.S. Pat. No. 6,196,409 to Lake et al. ("Lake") discloses a cap or container including a filter vent that has no structural adaptation to prevent the filter from contacting the contents of the container. Instead, Lake relies on the matching of the filter material to the physicochemical properties of the contents of the container, so that the filter material encourages the phase separation and run-off of contents that have contacted the filter. This material-matching requirement limits the selection of filter materials that can be used with any particular type of contents. Furthermore the encouragement of drainage of container contents after they have contacted a filter is less desirable than the prevention of contact between the contents and the filter in the first place.

Container-mouth baffles, such as sifters, are used to regulate the dispensing of granular materials through the mouth of a container. A typical example is the sifter top disclosed by U.S. Pat. No. 5,513,781, to Ullrich, et al. ("Ullrich"). The sifter top includes a perforated liner extending across the mouth of a bottle suitable for containing spices or similar materials. Sifters typically include perforations large enough to permit the passage of granular materials out of a container.

Container-mouth baffles can potentially protect the filter of a filter cap from the contacting the contents of a container, but they have never been situated, or provided with appropriate perforations, to perform such a protective function. There is a need for assemblies and methods for protecting a filter cap with a container-mouth baffle.

SUMMARY OF THE INVENTION

The present invention provides a filter baffle assembly, including a filter cap engageable to a mouth of a container, the filter cap including a filter vent operatively attached to a liner situated within an inner space of the filter cap, and a gas permeable point baffle welded to the liner and covering the filter vent, the point baffle including at least one perforation to permit gas exchange between an interior of the container and the filter vent, and to protect the filter vent from contact with contents housed in the interior of the container.

The present invention also provides a gas permeable baffle for protecting a filter vent from contact with the contents of a container, the point baffle including at least one perforation, the point baffle being welded to a liner and covering a filter vent operatively attached to the liner, housed within a cap engageable to the mouth of the container.

The present invention further provides a method of protecting a filter vent from the contact with the contents of a container, by sealingly engaging a gas permeable point baffle to a liner including a filter vent, engaging a filter cap to the mouth of the container, the filter cap including the liner and filter vent, permitting gas exchange between an interior of the container and the filter vent, through the point baffle, and with the point baffle, protecting the filter vent from contact with contents situated in the interior of the container.

BRIEF DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

A filter baffle assembly according to the present invention, generally shown at 10, includes a perforated, gas permeable baffle 12 interposed between the mouth M of a container, such as a bottle B, and a filter vent 14 mounted in a cap 16 or other closure of the bottle B. In a preferred embodiment, the baffle 12 extends across the entire mouth M of the bottle B, being engaged in a gas tight seal to the rim R of the mouth M. The gas tight seal can be formed by an induction weld, a conduction weld, an adhesive, or any other gas-tight sealing means known in the art.

Figure 1:
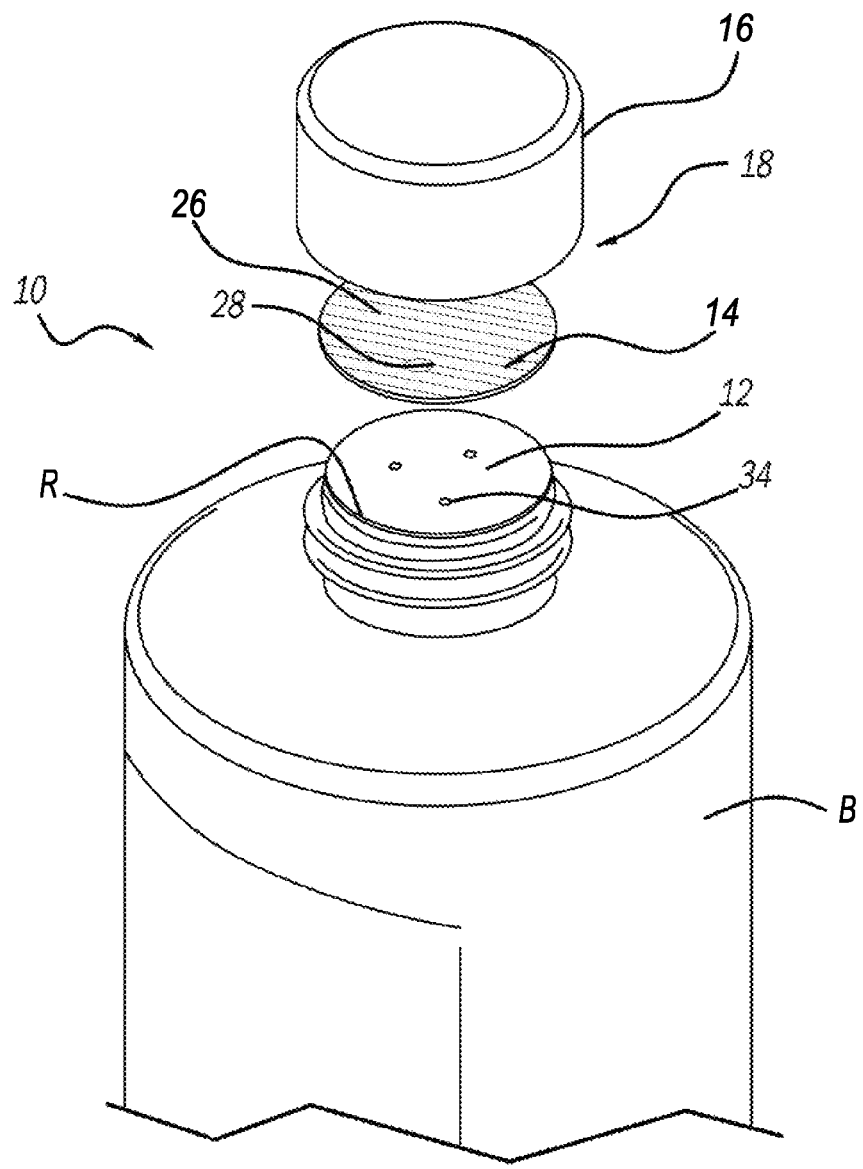
FIG. 1 shows an exploded perspective view of a bottle including a filter baffle assembly according to the present invention.
Figure 2:
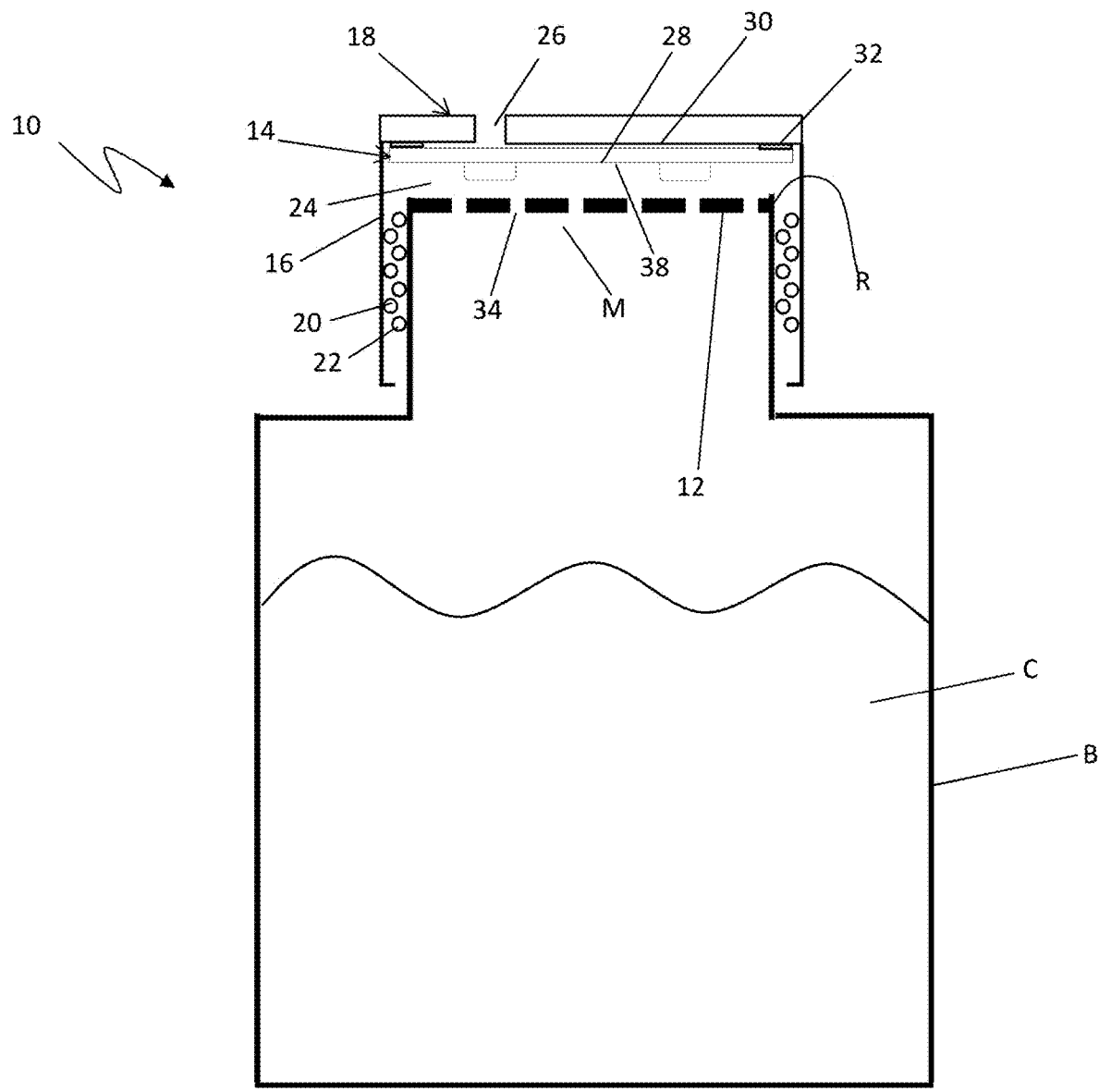
FIG. 2 shows a cross-sectional view of a bottle including a filter baffle assembly, with the baffle sealingly engaged to a mouth of the bottle; the interior space within filter baffle assembly is exaggerated to show structures more clearly.

The filter baffle assembly 10 also includes a filter cap 18 to reversibly seal the bottle B while permitting gas exchange through the filter vent 14. Any suitable filter cap 18 can be included in the present invention. An exemplary filter cap 18 is shown in FIG. 2. It includes a screw cap 16, including cap threads 20 that are complementary to bottle threads 22. Alternatively, the filter cap 18 can include any other suitable reversibly sealing closure known in the art, such a snap cap (not shown). The cap 16 defines an interior space 24, facing the mouth M of the bottle B. The filter cap 18 also includes a filter vent 14, including a vent aperture 26 extending through the cap 16, and a filter 28, preferably a microporous filter, which is affixed onto the interior surface 30 of the cap 16. The filter 28 can be affixed by any suitable gas-tight affixation means, such as a layer of adhesive 32, or a weld (not shown). The preferred filter 28 is composed of expanded polytetrafluoroethylene (ePTFE). When passage of microorganisms is to be prevented, a filter medium 28 with pores of 0.02-5.0 microns is preferred. If the contents C of the bottle B includes liquids of low surface tension, such as alcohols, and oils, oleophobic PTFE may be preferred, as its pores are resistant to clogging by such substances. Alternatively, any medium which can permit a bi-directional flow of gas may be used as the filter medium, including, but not limited to, paper and porous ceramic media. The filter vent 14 can also include a backing or liner 52 (shown in FIG. 5) to support the filter 28.

The baffle 12 includes at least one perforation 34 extending completely through the baffle 12, and preferably a plurality of perforations 34. The physicochemical properties of the baffle 12 can be any set of properties which protect the filter vent 14 from contact with the contents C of the bottle B, when the contents C splash against, or come to rest against, the baffle 12. The term "properties which protect the filter vent from contact with the contents C" is defined as any set of properties which permit gas diffusion through the baffle 12, while either completely barring contact between the contents C and filter vent 14, or limiting and/or retarding contact sufficiently to preserve the gas permeability and venting function of the filter vent 14. Relevant properties include, but are not limited to, the composition of the baffle 12, and the number, diameter, and distribution of the perforations 34 in the baffle 12.

The preferred diameter of the perforations 34 lies in the range of from 0.2 μm to 1/16", inclusive. The values are approximate, and ends of the range can differ by −0.01 Micron to +0.031". The baffle 12 material is preferably selected from foil, foam, pulp, and paper. The foil of the baffle 12 can include a tamper-evident foil, such as that disclosed for example in U.S. Pat. No. 5,341,948 to Gaeta (not shown). It can include a radio frequency identification ("RFID") system, to emit a predetermined radio frequency signal if the integrity of the baffle 12 has been compromised (not shown). An exemplary RFID-equipped foil is disclosed by U.S. Pat. No. 7,782,212 to Burns, et al.

In general, the selection of baffle 12 properties is readily determined by experimentation, and will depend at least on the hydrophobicity and pore size of the filter 28, the hydrophobicity and viscosity of the contents C, and the expected duration of exposure of the filter 28 to the contents C of the bottle B. For example, a bottle B for a 2-Cycle Motor Oil included a filter cap 18 with a filter vent 14 having a 0.2 μm ePTFE filter 28, on a grooved foam liner 52, in combination with a 3-perforation baffle 12 composed of induction welded foil. The diameter of the perforations 34 was 0.0625". The 0.0625" diameter was chosen because the oil was found to clog perforations 34 of smaller diameter.

The baffle 12 of the present invention is optimally suited to protect a filter vent 14 from viscous liquids, but can be readily adapted for use with any type of contents C, such as non-viscous fluids and fine powders, with appropriated selection of baffle 12 properties.

Baffles in the form of sifters, slots, or other dispensing structures, situated at the mouth M of a bottle B, are well known, but the present invention provides a novel combination of a baffle 12 and a filter cap 18, wherein the baffle 12 protects a filter vent 14 within the filter cap 18 from contact with the contents C of the bottle B. Specifically, the present invention provides a filter baffle assembly 10, in which a perforated, gas permeable baffle 12 is transposed between the mouth M of a bottle B, or other container, and a filter vent 14 situated within a filter cap 18 engaged with the mouth M of the bottle B. The present invention also provides a gas permeable baffle 12 for protecting a filter vent 14 from contact with the contents C of a bottle B. The baffle 12 includes at least one perforation 34, and is interposable between the mouth M of the bottle B and a filter vent 14 situated within a filter cap 18. Also provided is a method for protecting a filter vent 14 from contact with the contents C of a bottle B, or other container, including the steps of sealingly engaging a perforated baffle 12 to the mouth of a M of a bottle B; engaging a filter cap to the mouth M of the bottle B, the filter cap 18 including a filter vent 14; permitting gas exchange between the interior of the bottle B and the filter vent 14, through the baffle 12; and with the baffle 12, protecting the filter vent 14 from contact with the contents C of the bottle B.

In contrast to the filter caps disclosed by Vakharia and by Lake, the devices and methods of the present invention protect the filter vent 14 from contact with the contents C of the bottle B, rather than attempting to ameliorate the effects of contact after the fact. Unlike the filter cap disclosed by Lake, the present invention is compatible with filters 28 composed of any suitable gas permeable material.

In most if not all cases, the diameter of the perforations 34 of the baffle 12 will be too small to permit the use of the baffle 12 as a dispenser of the contents C of the bottle B. Therefore, it is contemplated that a user will remove the baffle 12 before dispensing the contents C. The foil, pulp, or paper composition of the baffle 12 of the present invention is easily punctured, peeled away, or otherwise permanently removed by a user. In an alternative variation (not shown), the baffle 12 is reversibly removable, and can be reinstalled by a user to continue the protection of the filter vent 28 from the contents C of the bottle B. A relatively stiff and durable material, such as a thick foil, or a polyamide such as nylon, is preferred for a reversibly removable baffle 12.

Figure 3:
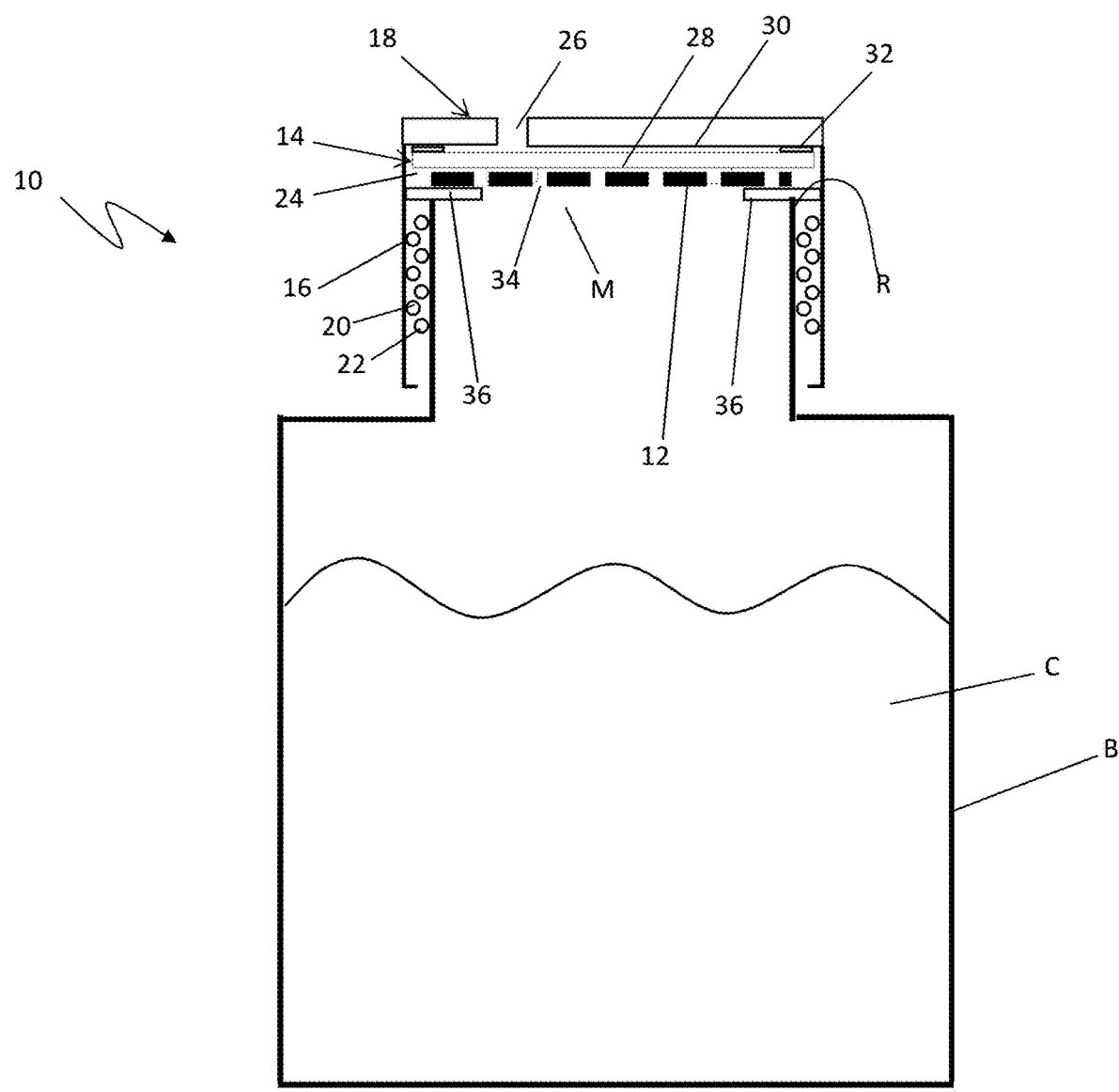
FIG. 3 shows a cross-sectional view of a bottle including a filter baffle assembly, with the baffle situated within the cap of a filter cap.
Figure 4:
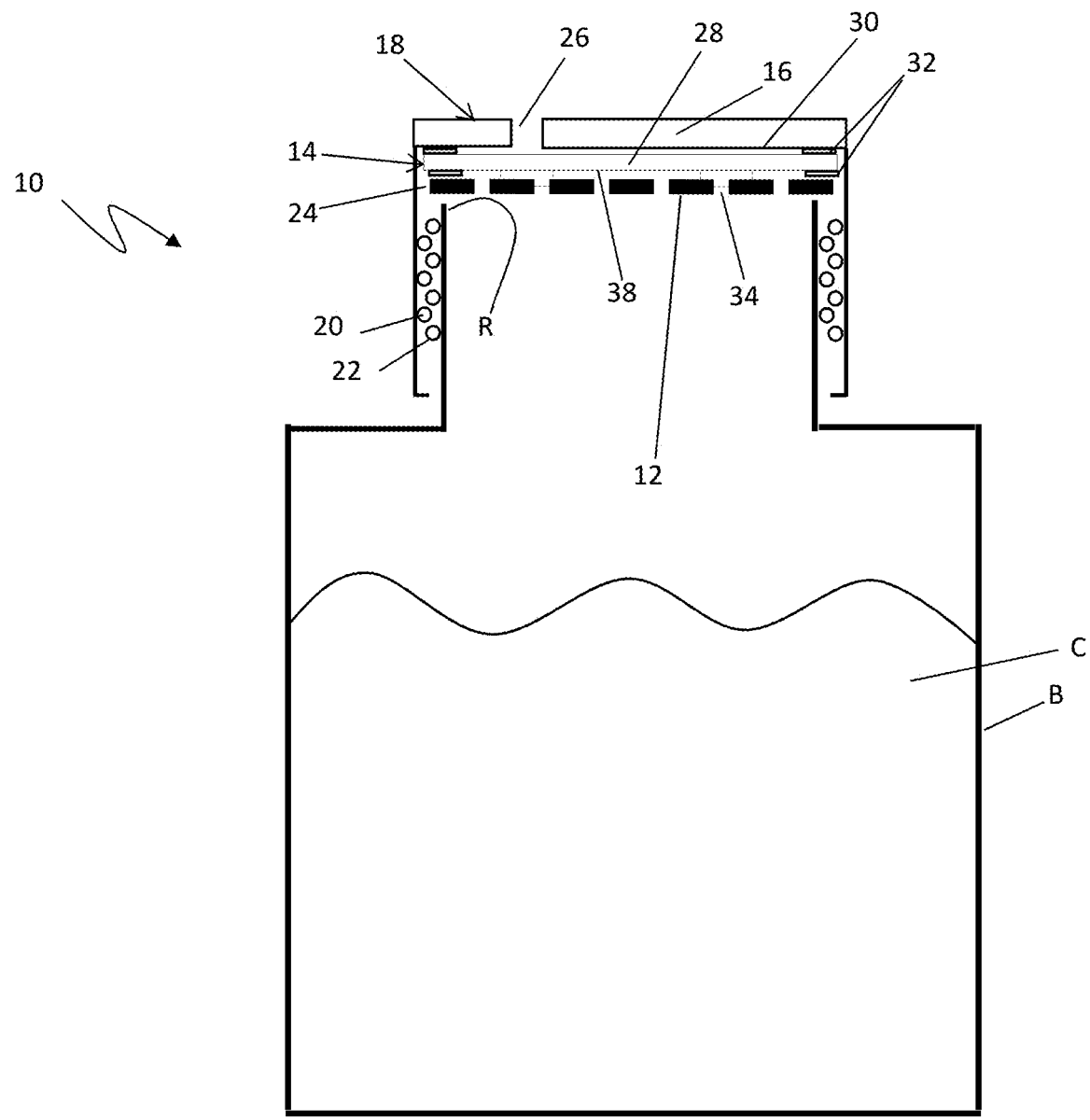
FIG. 4 shows a cross-sectional view of a bottle including a filter baffle assembly, with the baffle situated within the cap of a filter cap, in sealing engagement with a filter vent.

Also within the scope of the present invention are "in-cap" embodiments of the filter baffle assembly 10 wherein the baffle 12 is situated within the cap 16, rather than being sealingly engaged in a gas tight seal to the rim R of the mouth M of the bottle B. In one non-limiting example of this in-cap embodiment, shown in FIG. 3, the baffle 12 is sealed to a mounting ring 36, which projects inward from the interior surface 30 of the cap 16, with the baffle 12 interposed between the mouth M of the bottle B and the filter vent 14. The baffle 12 can be sealed to the mounting ring 36 by any suitable gas-tight affixation means, such as a layer of adhesive, a suitable weld (not shown), and a compressive fit between the mounting ring 36 and the filter 28. In another non-limiting example, shown in FIG. 4, the baffle 12 is sealed directly to the inner surface 38 filter vent 14, for example by a layer of adhesive 32 located about the periphery of the baffle 12.

Alternatively, the baffle 12 can be situated within the cap 16 in any location, and anchored by any suitable means, to bring it into protective interposition between the mouth M of the bottle B and the filter vent 14.

Alternative configurations and locations of the filter vent 14 are also within the scope of the present invention. In one non-limiting example (not shown), the filter vent 14 can vent through the threads 20 of the cap 16, rather than through a vent aperture 26 in the cap 16.

Figure 5:
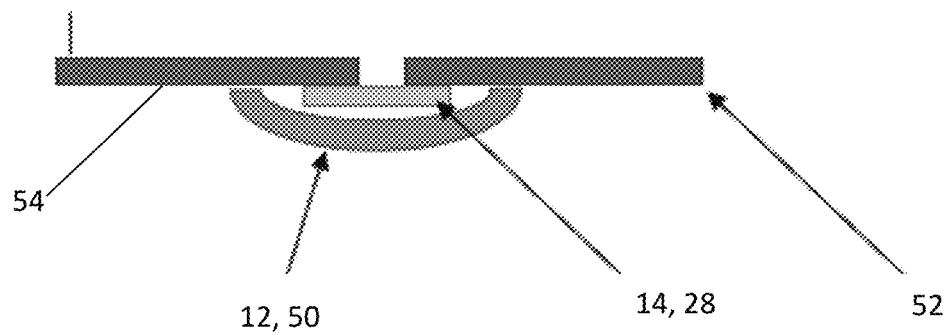
FIG. 5 is a cross-sectional view of a point baffle welded directly to a vented liner assembly.

In a further alternative embodiment, shown in FIG. 5, the baffle 12 can be a point baffle 50 that is welded directly to a surface 54 of the liner 52 to cover the filter vent 14 and filter 28 within the cap 16. The weld can be accomplished by heat steaking. The liner 52 can be made of paper, foil, foam, plastics, or pulp. In this embodiment, there is no need to use a container to secure the baffle 12 to the vented liner 52 by induction, conduction, or adhesive. In other words, by using a point baffle 50, only the filter vent 14 and filter 28 are protected, not the entire surface 54 of the liner 52. The point baffle 50 can have any of the properties described above for the baffle 12, such as any number and arrangement of perforations 34 or size. The point baffle 50 need not be removed from the liner 52 before using the contents of the container, since the mouth M of the bottle B would now be uncovered once the cap 16 is removed.

Although the exemplary container is a bottle B, it will be understood that the present invention is readily adapted to any type of gas tight dispensing container having a mouth, including, but not limited to, wide mouth jars, flexible bags, screw-top or snap-cap cans, and dispensing cartons. It will be understood that the exemplary term "mouth" includes any opening through which the contents of a container can be dispensed.

It will also be understood that the filter baffle assembly 10 of the present invention is not limited to filter caps 18 situated at the mouth M of a container, but is readily fitted to any container orifice, such as a vent port (not shown) situated in the wall of a container. Thus, the present invention provides a filter baffle assembly 10 including a filter holder (not shown) engageable to a vent port (not shown) of a container (not shown), the filter holder (not shown) including a filter vent 14 situated within an inner space (not shown) of the filter holder (not shown), and a baffle 12 interposable between the vent port (not shown) and the filter vent 14.

The invention has been described in an illustrative manner, and it is to be understood that the terminology, which has been used is intended to be in the nature of words of description rather than of limitation. Obviously, many modifications and variations of the present invention are possible in light of the above teachings. It is, therefore, to be understood that within the scope of the appended claims, the invention can be practiced otherwise than as specifically described.

The invention claimed is:

1. A gas permeable point baffle for protecting a filter vent from contact with the contents of a container, said point baffle comprising at least one perforation, said point baffle being welded to a liner and covering a filter vent operatively attached to said liner, housed within a cap engageable to the mouth of the container, wherein said point baffle is sized to cover only said filter vent and not an entire surface of said liner, and wherein said point baffle faces inside said container.

2. The gas permeable point baffle of claim 1, wherein said point baffle is welded to said liner by heat steaking.

3. The gas permeable point baffle of claim 2, wherein said point baffle is composed of a material selected from the group consisting of foil, foam, pulp, paper, and tamper-evident foil.

4. The gas permeable point baffle of claim 3, wherein said at least one perforation has a maximum diameter lying in the range of 10 μm to 1/16 inch, inclusive.

5. The gas permeable point baffle of claim 1, wherein said liner is made from a material chosen from the group consisting of paper, foil, foam, plastics, and pulp.

* * * * *